United States Patent
Taylor, Jr. et al.

(10) Patent No.: US 6,710,812 B2
(45) Date of Patent: *Mar. 23, 2004

(54) GEOGRAPHICALLY DIVERSE CLOSED CAPTIONED NEWS TEXT DATABASE

(75) Inventors: Joe Dulin Taylor, Jr., Tulsa, OK (US); Jeremy Mitts, Tulsa, OK (US)

(73) Assignee: Medialink Worldwide, Inc.

( * ) Notice: Subject to any disclaimer, the term of this patent is extended or adjusted under 35 U.S.C. 154(b) by 106 days.

This patent is subject to a terminal disclaimer.

(21) Appl. No.: 09/907,578

(22) Filed: Jul. 18, 2001

(65) Prior Publication Data

US 2002/0015106 A1 Feb. 7, 2002

Related U.S. Application Data

(63) Continuation of application No. 09/332,723, filed on Jun. 14, 1999, now Pat. No. 6,266,094.

(51) Int. Cl.[7] .......................... H04N 5/278; H04N 7/08; H04N 7/16
(52) U.S. Cl. .......................... 348/465; 348/468; 725/53; 725/86; 725/115; 725/137
(58) Field of Search .......................... 348/461, 465–468, 348/478, 552, 554, 906, 569, 589; 725/86–104, 137, 139, 145, 115, 120, 53; 707/3, 10; 709/219; H04N 5/278, 7/08, 7/16

(56) References Cited

U.S. PATENT DOCUMENTS

| | | | |
|---|---|---|---|
| 5,140,419 A | | 8/1992 | Galumbeck et al. |
| 5,276,866 A | * | 1/1994 | Paolini ........................ 725/114 |
| 5,428,400 A | | 6/1995 | Landis et al. |
| 5,481,296 A | * | 1/1996 | Cragun et al. ............... 348/461 |
| 5,703,655 A | * | 12/1997 | Corey et al. ................ 348/468 |
| 5,752,159 A | * | 5/1998 | Faust et al. ................. 725/105 |
| 5,809,471 A | * | 9/1998 | Brodsky ...................... 348/460 |
| 5,821,982 A | * | 10/1998 | Santilli et al. .............. 725/137 |
| 5,867,205 A | * | 2/1999 | Harrison ...................... 725/38 |
| 5,883,675 A | | 3/1999 | Herz et al. |
| 5,945,987 A | * | 8/1999 | Dunn ........................... 345/718 |
| 5,995,155 A | * | 11/1999 | Schindler et al. ........... 348/461 |
| 6,005,565 A | * | 12/1999 | Legall et al. ................ 345/721 |
| 6,025,837 A | * | 2/2000 | Matthews et al. .......... 345/721 |
| 6,061,056 A | * | 5/2000 | Menard et al. ............. 345/704 |
| 6,064,438 A | * | 5/2000 | Miller ......................... 348/465 |
| 6,072,982 A | * | 6/2000 | Haddad ........................ 725/93 |
| 6,243,676 B1 | * | 6/2001 | Witteman ................... 704/243 |
| 6,256,072 B1 | | 7/2001 | Bae et al. |
| 6,263,342 B1 | * | 7/2001 | Chang et al. .................. 707/1 |
| 6,263,507 B1 | * | 7/2001 | Ahmad et al. .............. 725/134 |
| 6,266,094 B1 | * | 7/2001 | Taylor, Jr. ................... 348/465 |
| 6,295,092 B1 | * | 9/2001 | Hullinger et al. ........... 345/723 |
| 6,320,621 B1 | * | 11/2001 | Fu .............................. 348/465 |
| 6,323,911 B1 | * | 11/2001 | Schein et al. ............... 348/552 |
| 6,430,357 B1 | * | 8/2002 | Orr ............................... 386/69 |
| 6,493,744 B1 | * | 12/2002 | Emens et al. ............... 709/203 |
| 6,564,383 B1 | * | 5/2003 | Combs et al. .............. 725/136 |
| 2002/0072895 A1 | * | 6/2002 | Imanaka et al. .............. 704/9 |

* cited by examiner

*Primary Examiner*—John Miller
*Assistant Examiner*—Brian Yenke
(74) *Attorney, Agent, or Firm*—Lackenbach Siegel LLP

(57) ABSTRACT

A news search resultant database containing a plurality of decoded closed captioned common news story texts from geographically diverse television stations, which texts have format consistency regardless of the origin of the respective texts. The database is readily readable.

19 Claims, 5 Drawing Sheets

GEOGRAPHICALLY DIVERSE CLOSED CAPTIONED NEWS TEXT DATABASE

PRIOR RELATED APPLICATIONS

This application is a continuation of Ser. No. 09//332,723, filed Jun. 14, 1999, now U.S. Pat. No. 6,266,094, granted Jul. 24, 2002.

BACKGROUND OF THE INVENTION

1. Field of the Invention

The present invention relates to the monitoring, decoding, transmission, filing and retrieval of television word content generally and, more particularly, but not by way of limitation, to a novel method for aggregating into a single, searchable database the closed captioned text from a large number of broadcast sources originating from multiple locations.

2. Background Art

Currently, every week in the United States alone, television stations create more than 12,000 hours of local news programming. Network and cable news organizations broadcast an additional 1,400+ hours. Because every newscast contains references to specific persons, organizations, and events, an entire industry has grown up to monitor newscast content on behalf of news makers. However, no single monitoring company, using traditional methods, is able to monitor all US television newscasts on a timely basis. Too costly is the traditional monitoring approach, which requires workers to videotape and then view and quickly summarize the content of TV newscasts. A need exists for news makers and other interested parties to have near real time access to a database of newscast content that is comprehensive and cost effective.

One approach to automatic television broadcast monitoring is disclosed in U.S. Pat. No. 5,481,296, issued Jan. 2, 1996, to Cragunet al., and titled APPARATUS AND METHOD FOR SELECTIVELY VIEWING VIDEO INFORMATION, which describes a television and editing system that uses closed captioned text to locate items of interest. In the system, a closed captioned decoder extracts a closed captioned digital text stream from a television signal. A viewer specifies one or more keywords to be used as search parameters and a digital processor executing a control program scans the closed captioned digital text stream for words or phrases matching the search parameters. The corresponding video segment of the television broadcast may then be displayed, edited, or saved. In one mode of operation, the television presentation system may be used to scan one or more television channels unattended and save items which may be of interest to the viewer. In another mode of operation, the system may be used to assist editing previously stored video by quickly locating segments of interest. One disadvantage of such a system is that extremely large amounts of memory are required to store the video segments and it would be desirable to simply select, store, and index for later retrieval text content of closed captioned.

Another approach to event processing is disclosed in U.S. Pat. No. 5,752,159 issued May 12, 1998, to Faust et al and titled METHOD FOR AUTOMATICALLY COLLECTING AND DELIVERING APPLICATION EVENT DATA IN AN INTERACTIVE NETWORK, which describes a method for the automatic collection and dissemination of multi-dimensional data over public networks. Differentiable aspects of the applicant pertain to 1) the specificity of the data content that is monitored and collected and 2) only single dimensional data is processed as opposed to multi-dimensional data. As such, the cost and complexity of the applicant design is significantly less than the Faust design.

Another approach to closed caption processing is disclosed in U.S. Pat. No. 5,809,471 issued Sep. 15,1998 to Brodsky et el and titled RETRIEVAL OF ADDITIONAL INFORMATION NOT FOUND IN INTERACTIVE TV OR TELEPHONY SIGNAL BY APPLICATION USING DYNAMICALLY EXTRACTED VOCABULARY, which describes a method for the automatic decoding and monitoring of closed caption data over television networks. A significant differentiable shortcoming of the subject pertains to 1) that server based features are missing and 2) only single closed captioned data is monitored from a specific geographic site as opposed to broad geographical and dispersed sites. As such, the features and benefits of the applicant design are significantly greater than the Brodsky design.

Accordingly, it is a principal object of the present invention to provide a timely, comprehensive, and cost effective means for the monitoring, decoding, transmission, filing and retrieval of television word content through the client server based processing of closed captioned text. It is a further object of the invention to provide such means that makes such text accessible to end users via the World Wide Web or other communication networks. Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a system for the aggregation and selective retrieval of television word content from closed captioned text streams, comprising: tuner means to receive one or more television signals; decoder means operatively connected to said tuner means to decode closed captioned text stream in said one or more television signals and to write said closed captioned text stream to a file according to preprogrammed parameters; and transmission means to manage the multiple requirements of sending and receiving from distributed and dispersed local clients; and filing means to collect, condition, sort, postprocess, index, manage, archive and present text based files; and central server means operatively connected to said decoder means to store said file and make said file available to a user of said system.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

The video component of a conventional television signal includes what are known as video blanking intervals (VBI) capable of carrying encoded information. In the United States, Line 21 of the VBI is reserved for the encoding of closed captioning. Closed captioning, which is mandated by the Federal Government for most television programs, is a textual representation of the audio portion of a television program. Originally devised as a means for making program dialogue accessible to the deaf and hearing impaired, closed captioning is often displayed now for the convenience of non-deaf persons in environments where television audio is not practical, such as noisy restaurants and airport kiosks.

A number of commercially available computer hardware devices and internal computer boards provide closed captioning decoding capabilities. The preferred embodiment of the present invention makes use of a computer board manufactured by the PosTech Company of Madison, Wis. However, any decoding device for video Line 21 of the VBI may be incorporated into the system. A television signal tuning device is also required to deliver a specified television station to the decoding device. The PosTech board includes four television tuners and four corresponding video Line 21 of the VBI decoders, allowing for the simultaneous decoding of up to four different television programs. Of course, any number of such boards may be provided to decode-any desired number of television programs. The system requires that a computer and necessary tuners and decoders are geographically located so as to be able to receive specific television station signals. The PosTech board is the preferred hardware for decoding closed captioning. This board is PC compatible and includes 1–4 simultaneous channels of closed captioned text support. Each board includes its own splitter/amplifier, on board TV tuners and closed caption decoders for each channel. The standard configuration includes one RF video input and two baseband inputs for internally routed video. In addition, video and audio output monitoring is provided for ease of use and channel verification.

Figure 1:
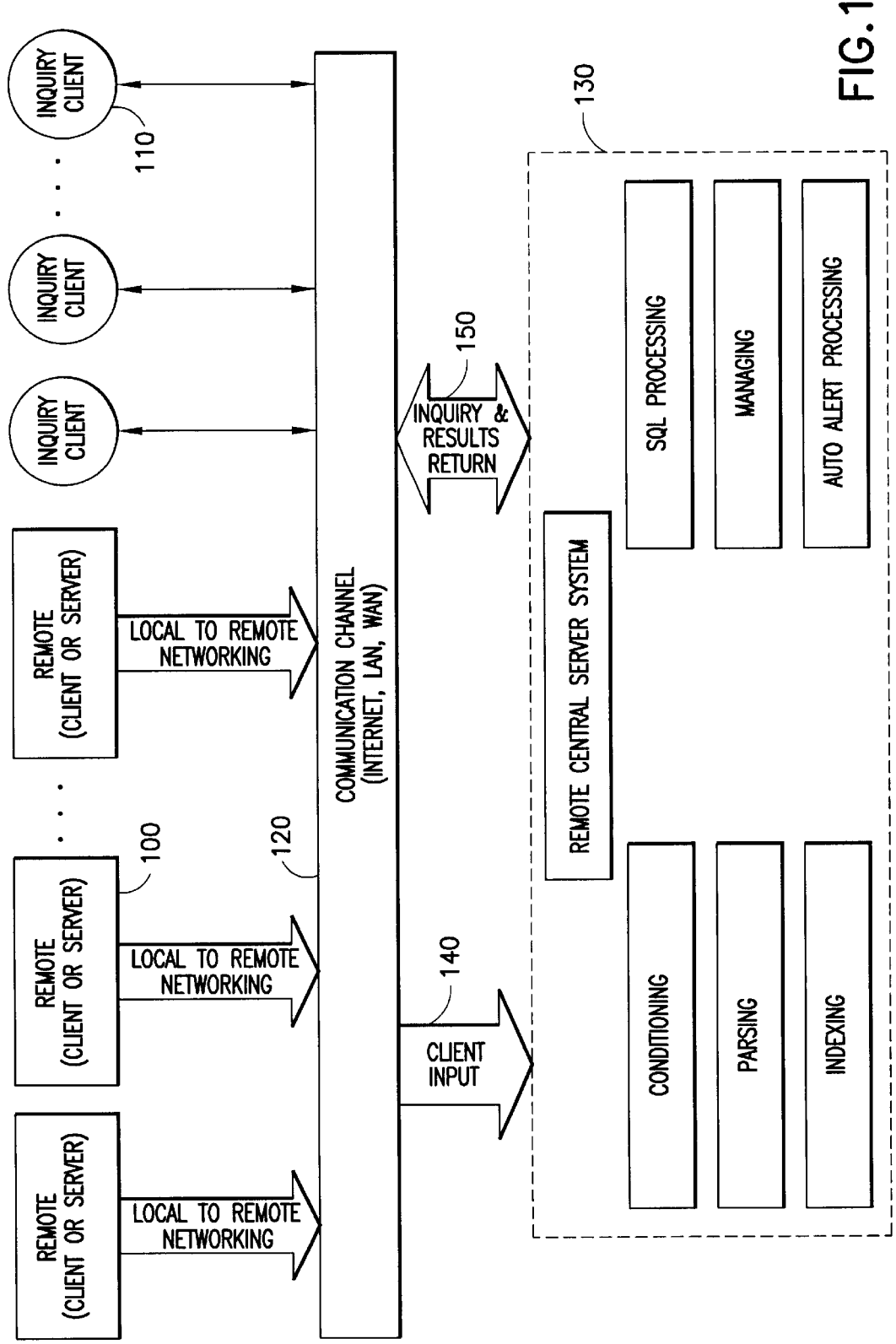
FIG. 1 is block diagram view of the system of the present invention which involves local client and server processing for text collection and inquiry processing as well as communication methods, and remote central server methods for text processing.

FIG. 1 illustrates the total system processing according to the present invention, in which all aspects of the client server capabilities are delineated. The remote clients or servers, 100, are the closed caption decoder generation points (clients) within the aggregate system. The remote clients or servers, 100, communicate with the remote central server, 130, using appropriate communication methods and channels, 120, with a client input program, 140, to the remote central server. The client input program, 140, manages the communication requirements across all of the various closed captioned source material arriving asynchronously from one or a multitude of remote clients or servers, 100.

The inquiry clients, 110, are used to specify the desired search requirements to be employed across the complete collection of closed captioned text maintained in the remote central server, 130. Client inquiries are specified, maintained locally and transmitted using bidirectional communication methods and channels, 120, with an inquiry client and results return program, 150, to the remote central server. The remote central server, 130, receives the inquiry requirements, maintains an active communication link with the client, 110, and returns the requested information to the client using bi-directional communication methods and channels, 120, via the results return program, 150. The remote central server, 130, can, in addition, automatically transmit results back to the inquiry client, 110, at any time when pre-specified search requests have been initialized and positive search results are available. In this situation, the inquiry client, 110, has previously defined a set of search conditions for closed captioned text and has stored that definition on the remote central server, 130, during a previous inquiry session. The inquiry client completes the communication task and returns to an inactive and offline mode essentially dropping all active communication through task 150 and communication channel and methods, 120.

This search definition remains active within the remote central server, 130, as the server continuously tests all received closed captioned material from all clients, 100, for the prescribed search material. If and when the material is located, the remote central server, 130, initiates an automatic communication request to the responsible inquiry client, 110, that posted the original request This communication request is handled by task 150 using communication methods and channels, 120.

Figure 2:
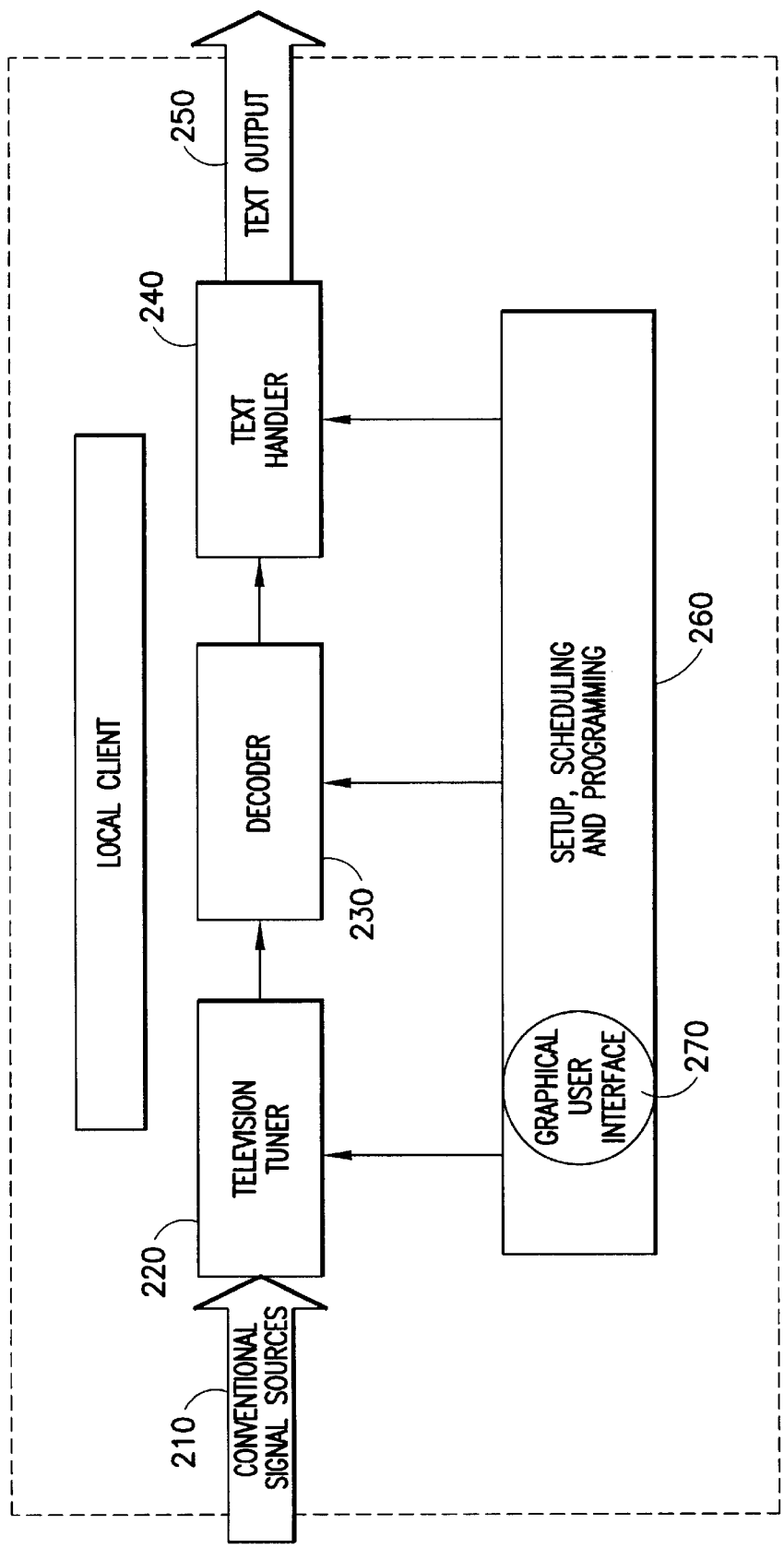
FIG. 2 shows the design of the basic text collection client which involves television tuning capabilities, closed caption decoding capabilities, text handling capabilities and output capabilities either to a local server or to a remote central server.

The analysis of the remote client functions begin with FIG. 2, which covers the local client processing associated with the initial text processing process. The process begins with one or more video signal(s) from an antenna, cable television service or other conventional video source (i.e. VCR) connected via 210 and delivered to a tuning device(s), 220. The tuner(s) is(are) tuned to desired frequencies by hardware and software functions contained in 260, via a graphical user interface 270. The setup, scheduling and programming functions of 260, manage the television program decoding and scheduling 230, and file-writing processes 240. The preferred embodiment of such software is a program known as TeleCap™, developed for and owned by Medialink Worldwide, Inc. However, other, similar programs are available and may be substituted.

Telecap™, a preferred program for decoding closed captioning, is a DOS program that reads ASCII data from a computer's communications ports and manages the data according to user defined variables.

Ccapture™ is an alternative program for decoding closed captioning. CCapture™ provides an effortless method to simultaneously decode and record multiple channels of closed caption and data transmitted on Field 1/Field 2 of the Line 21 VBI. A simple user interface permits advance scheduling of unattended recordings on up to four broadcast or cable programs concurrently. Recorded data is stored on the local PC hard disk and/or sent in ANPA wire format to any newsroom automation system.

Le Petit Decoder™ is an alternative program for decoding closed captioning. Le Petit Decoder™ by SoftNi Corporation is a specialized closed caption decoding software designed to recover multi-lingual closed subtitles or standard closed captions from a video program, and save them to one or several computer files.

Tuned signals are passed to decoding devices 230. Decoders 230 interpret captions, which are encoded as ASCII (American Standard Code for Information Exchange) text. The decoders pass the text to the file-writing process, 240, of the caption management software. In addition to writing decoded captioning to a text file, the caption management software can insert into the text stream, as an option within the system, time stamps at selectable intervals, e.g. three-second intervals. In addition, the caption management software, as an option within the system, can create a header for the file that includes demographic information such as specifying the date, city, station call letters, program title, program start time and other variables as specified.

Each monitored television program event is saved as a text file within 240. The closing of the file triggers a text output process, 250, that sends the file either to 1) a local server or 2) to a remote central server. The file closing process can be automatically generated under user specified control or based upon system pre-set parameters governed by the application. For example file closing may occur automatically when 1) the recorded program concludes, 2) a specific time (e.g. 30 minutes past the hour) occurs, 3) a specific time interval has elapsed (i.e. 60 minutes), 4) a specific time has been requested (e.g. 2 AM) as well as other opportunities as warranted.

Figure 3:
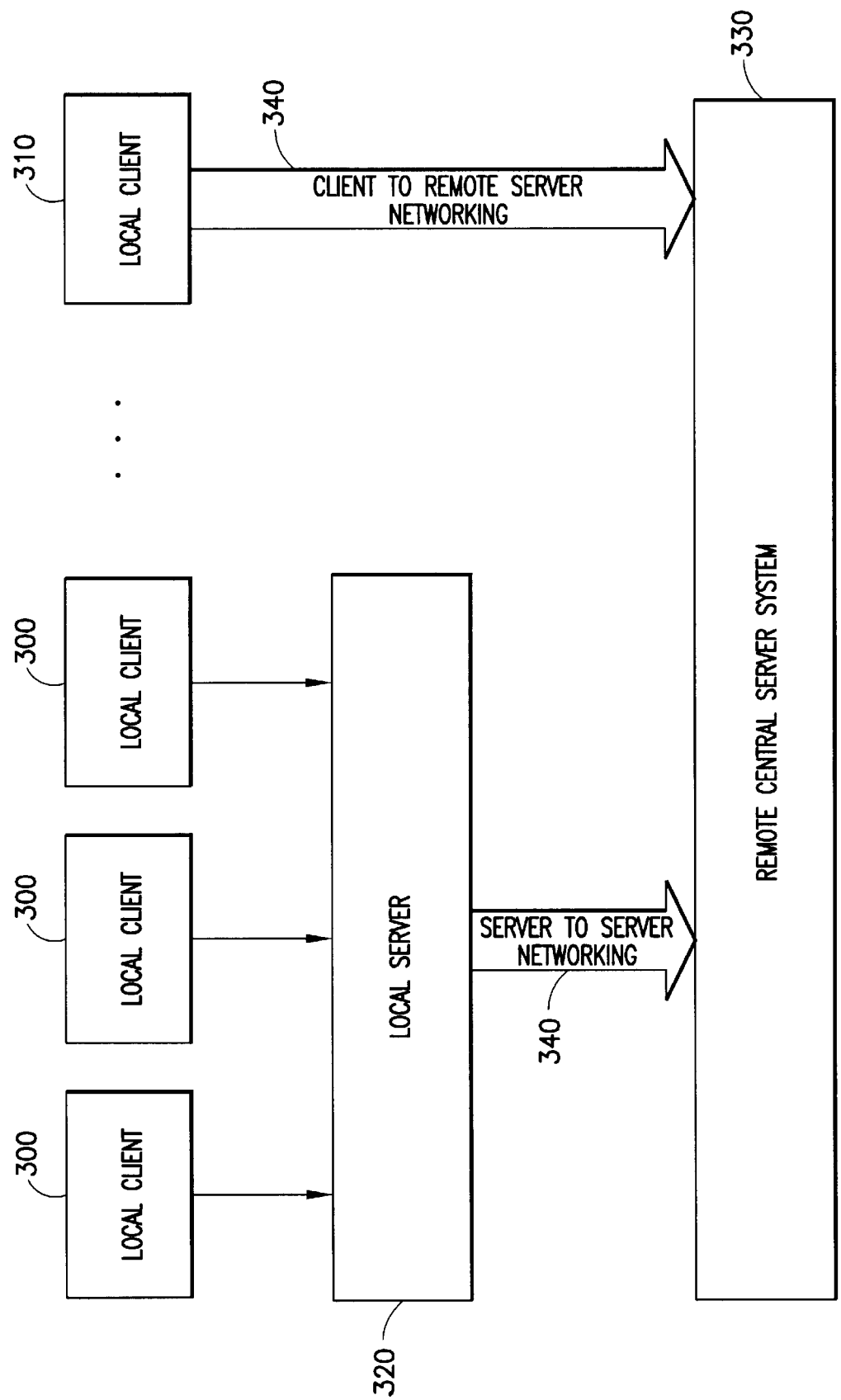
FIG. 3 shows the distributed aspects of the text collection client in which a local server and a remote central server are involved in the network design.

The various local client options for local and remote central server connections is shown in FIG. 3. The text output process, 250, is designed to eventually send all captured text files to a remote central server, 330, in FIG. 3. The remote central server, 330, receives text based closed captioned files from other local servers, 320, via the communication path and methods of 340, as well as local clients, 310, all shown in FIG. 3. In this manner, all closed captioned television content in the country (and possibly the world) can be monitored and centrally collected.

Conventional signal sources, 210, may be delivered via cable, composite, video tape or other means without restricting the intended purpose. For example, previously recorded video tapes with embedded closed captioned segments can be offered to the system via 210 without compromise or loss of application. If desired, a control processing unit, 260, can manage the overall operation within the local client as well as communication tasks associated with the local server, 320, or the remote central server, 330, although this is not a requirement or restriction of the subject application. In some applications, a graphical user interface, 270, may be employed for ease of use. This is not however, a restriction upon the design as the implementation is application driven based upon the end use requirements.

Text output, 250, may involve the manual tasks of moving text based files from one client to another or to the available servers, 320 and 330. In other cases, 250, may involve electronic communication methods. For these reasons of application specificity, the local client, 300 and 310, may be comprised of a PC based unit with relevant PC based options (i.e. 220, 230 and 240). The local client, 300 and 310, may similarly involve a PC based design without a keyboard and monitor, as contained within process 270, or conventional PC case as when the clients are rack mounted in a studio.

Various local clients, 300 and 310, may be located 1) geographically, 2) strategically, 3) economically or 4) conveniently depending upon the eventual application. Each local client, 300 and 310, will communicate either with a local server, 320, or a remote central server, 330, depending upon the intended application. In some locales, numerous local clients, 300, will be communicating to a local server and the remote central server via the communication path and methods of 340, based upon the number of available television channels. In other situations, a single local client, 310, may satisfy all of the channel recording requirements and as such, a lower cost system is preferred whereas the local client, 310, communicates directly with the remote central server, 330, via the communication path and methods of 340.

Both the local server, 320, and the remote central server, 330, can manage particular aspects of the local client operation, such as 1) initialization, 2) programming, 3) upload and download times, 4) error processing and 5) updating. The local server, 320 and the local client, 310 communicate with the remote central server, 330, using the preferred method for the application. In some situations, this might be based upon the Internet and the World Wide Web (WWW) In other situations, it may be based upon a dedicated or shared Local Area Network (LAN) or Wide Area Network (WAN). In other situations, it may be based upon dial-up methods as specified by the application. The local clients, 300 and 310, may be situated at strategic locations not directly associated with any local or network television affiliates. In other situations, the local clients, 300 and 310, may be situated at the network or the local affiliate without constraining the application or the novelty of the subject invention.

Local servers, 320, may communicate with other local servers, 320, for centralization, redundancy, load sharing or for cost reasons without restricting the application. In this situation, one or all of the local servers, 320, would communicate via the communication path and methods of 340, directly to the remote central server, 330. In this scenario, the local server, 320, is a data (closed captioned text) collection server managing the resources of multiple local clients, 300. The local server, 320, is the primary process for eventual communication to the remote central server, 330, as time, conditions or other requirements are satisfied. For example, the local server, 320, may collect information from its assigned local clients during a 24 hour period. At the end of this period, a single communication session transfers the collected information to the remote central server.

Figure 5:
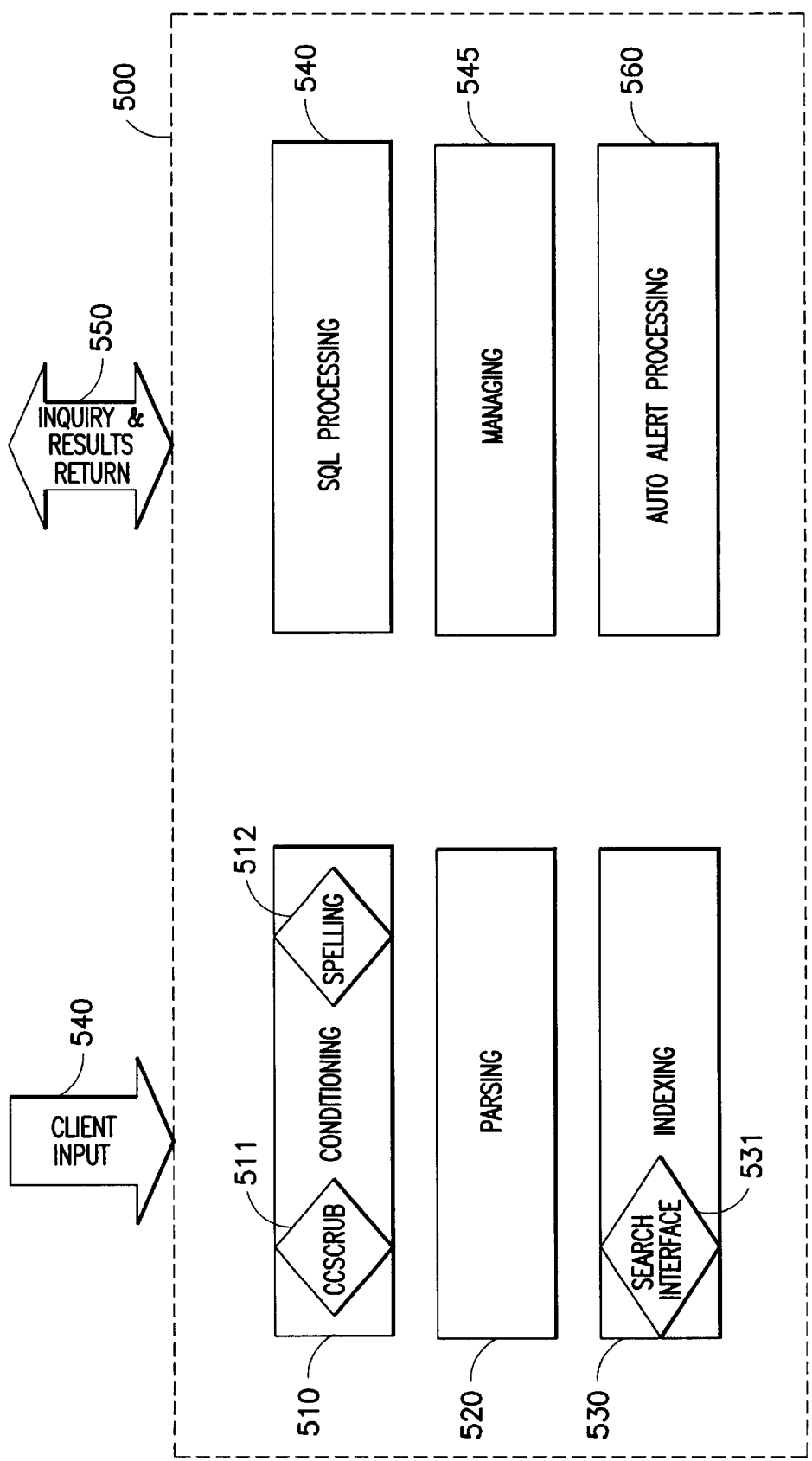
FIG. 5 shows the design of the remote central server system processing.

In referencing FIG. 5, the appearance of a new text file at the remote central server, 500, triggers a series of individual processes designed to enhance the integrity and uniformity of the material for search purposes. The client input program, 540, manages the communication requirements across all of the various closed captioned source material arriving asynchronously from one or a multitude of remote clients or servers: Dependent upon the application, for example, the first process of conditioning, 510, is called ccScrub™, 511. ccScrub™ is designed to impose format consistency across all text files regardless of their origin. Text files from different networks, geographic areas and locales may use non-conforming close caption standards. Several format standards are available for use although the recommended formatting standard is the standard established by the National Captioning Institute (NCI). Many broadcasters do not follow NCI standards. These broadcasters, however, often follow standards unique to their own organizations. As such, each remote central server, 500, can employ optional standards as specified. A capability within the system allows standards that deviate from NCI, but that are nevertheless consistent within a specific station, to be converted to the NCI standard. That is accomplished by ccScrub™ at step 511, by comparing each newly arriving text file against a database of station-specific format conventions. Conversion routines developed for specific stations are invoked to change a non-conforming format to NCI standard formatting.

Another routine, 512, contained in the conditioning process at step 511 imposes spelling and abbreviation consistency to all sources. For example, the company name AT&T is spelled many different ways by different broadcasters (i.e., A-T-and-T, A T & T, A T and T, etc.). The abbreviation routine searches for predefined variations of the company name and converts all of them to the standard abbreviation using process, 512.

Text files exiting the conditioning process, 510 and 511, are passed at step 520 to a second program involving parsing. The parsing program is called "ccSplit". ccSplit is designed to parse an entire newscast or television event into its unique story parts or segments. The caption management software collects an uninterrupted stream of captioning text during a predefined time interval. The time interval relates to the duration of a scheduled broadcast. The result is a text file containing all closed captioned text encoded in the Vertical Blanking Interval (VBI) during the entire time intervals, i.e., television programs. The ccSplit™ program, 520, applies two rules to determine the parsing points within a program. The first rule assumes the end of a segment whenever a user defined variable of time, e.g., 30 seconds, has elapsed without attendant captioning. The second rule assumes the end of a segment whenever the NCI story break character is present, i.e., ">>>" (three greater than symbols, also known as right angle brackets), unless the number of characters between sets of >>>'s is less than a user defined variable, e.g., 460 characters. Each derived segment is written to a separate file, including program origination information. The segment's total running time is also calculated and inserted into the file at a user defined location, i.e. on the next to the last line of the file. Other segment definition routines may be added to ccSplit, 520, to better attain the goal of delineating unique segments within a program.

The ccSplit™ parsing process 520, continues until all identifiable segments of a text file have been written to separate files. The ccSplit™ process, 520, is a process that includes five steps. The first step determines whether a closed captioned text file contains useful data. If a broadcaster has failed to provide captions for a given newscast or broadcast the resulting text file will contain only time stamps. The process involves counting the number of letter characters and the number of numeral characters in the file. This information is used to produce a ratio, which is then used to determine if the file is worth processing. If the file's letter to number ratio is below a user defined variable, e.g., 55 percent, the file is rejected for further processing. If the file's letter to number ratio is above a user defined variable the process continues to the next step. Step two searches for occurrences of the >>> symbol, the National Captioning Institute (NCI) standard symbol for denoting the beginning of a new story within a broadcast. Occurrences of the >>> symbol are marked for use in a subsequent step. Step three searches for occurrences of multiple time stamps uninterrupted by text and marks the beginning and ending of such sequences for use in a subsequent step. The number of time stamps in an uninterrupted sequence is a user defined variable. A certain number of uninterrupted time stamps denotes either the occurrence of a commercial break or other non-captioned segment of a newscast. Step four breaks the original closed captioned file into smaller files using the story and time stamp sequence markers created in steps two and three. The content between each marker is written to a new, separate file along with the header information from the master file. As the new files are being written, the program uses embedded time stamp information to calculate-estimated total running times for each segment, and this information is inserted as text at the bottom of the new file. The new files are named by sequential number and saved to a new directory named for the particular newscast being processed. When all the new files have been written the original file is deleted from the disk.

The preferred embodiment for the indexing program, 530, is the Microsoft® Index Server. Any appropriate indexing software, however, may be used. Each word in a text file is indexed along with the values contained in the file origination information. Another element of program 530 is a search engine interface, 531, allowing users to submit search parameters to the index. The preferred embodiment of such an interface is a series of World Wide Web pages. The pages are accessible via the Internet, although similar interfaces may be made available through other communications networks.

The search engine interface, 531, would allow searches using Boolean logic, i.e., search terms joined by any or a combination of the following operators or similar operators: AND, OR, AND NOT, NEAR. The results of submitted search parameters are written, for temporary use, to a database table within process 540 for structured query language (SQL) processing. The preferred embodiment is the Microsoft Sequel Server, although other databases may be used. Writing search results to a database allows for the ordering and other manipulation of the data.

The managing element, 545, of the remote central server system supports the need for file management, archiving, restore and backup and satisfies the overall fife integrity requirements of the system. An appropriate graphical user interface, similar to 410 and 450, are employed for these purposes.

The remote central server, 500, receives the inquiry requirements, maintains an active communication link with the inquiry client and returns the requested information to the client using bidirectional communication methods and channels via the results return program, 550. This communication request is handled by task using communication methods and channels, 120, shown in FIG. 1. Database search results are presented to the user via a web page or other method at step 550. The particular format of the results is considered to be the preferred embodiment of the system, although other formats may be developed. The essential elements of the format include the display of the full sentence or sentences in which the users search terms are contained, along with a citation drawn from the associated text files origination information.

Another system option provides for retrieval of the complete file from which a key sentence is drawn, thus allowing the user to read in context the full text surrounding any found search term.

Another system option provides a means for the user to compile only selected sentences and their citations to a report suitable for printing or otherwise preserving to a user s preferred format.

Another system option provides a means for the user to compile selected full text versions of found search terms to a report suitable for printing or otherwise preserving to a user's preferred format.

Another system process provides for ongoing automatic searches of a users predefined search parameters and the delivery of the results of such parameters to the user via electronically or other electronic messaging systems. The preferred embodiment of this automated search process is a program called AutoAlert™, 560. A web page interface in the Inquiry Client, for example, allows the user to specify AutoAlert™ parameters. AutoAlert™ process 560 submits all user-defined search parameters to the text index each time the index is updated with new information. The results are written to a database in the same fashion as described above. Database results are displayed via a web page in the same fashion as described above.

The remote central server, 500, can, in addition, automatically transmit results back to the inquiry client at any time when pre-specified search requests have been initialized and positive search results are available. In this situation, the inquiry client has previously defined a set of search conditions for closed captioned text and has stored that definition on the remote central server, 500, during a previous inquiry session. The inquiry client completes the communication task and returns to an inactive and offline mode essentially dropping all active communication through communication channel and methods, 550. This search definition remains active within the remote central server, 500, as the server continuously tests all received closed captioned material from all clients, for the prescribed search material. If and when the material is located, the remote central server 500, initiates an automatic communication request to the responsible inquiry client that posted the original request. At a user's discretion, results may also be delivered to the user via electronic mail or another electronic messaging system.

An important step in the remote central server processing are the functions associated with file management, 545. As defined by the user application, all remote central server, 500, system information including text information, system operational parameters, query postings, etc. are appropriately managed, archived and compressed as needed for system calibration, redundancy and report management purposes.

Figure 4:
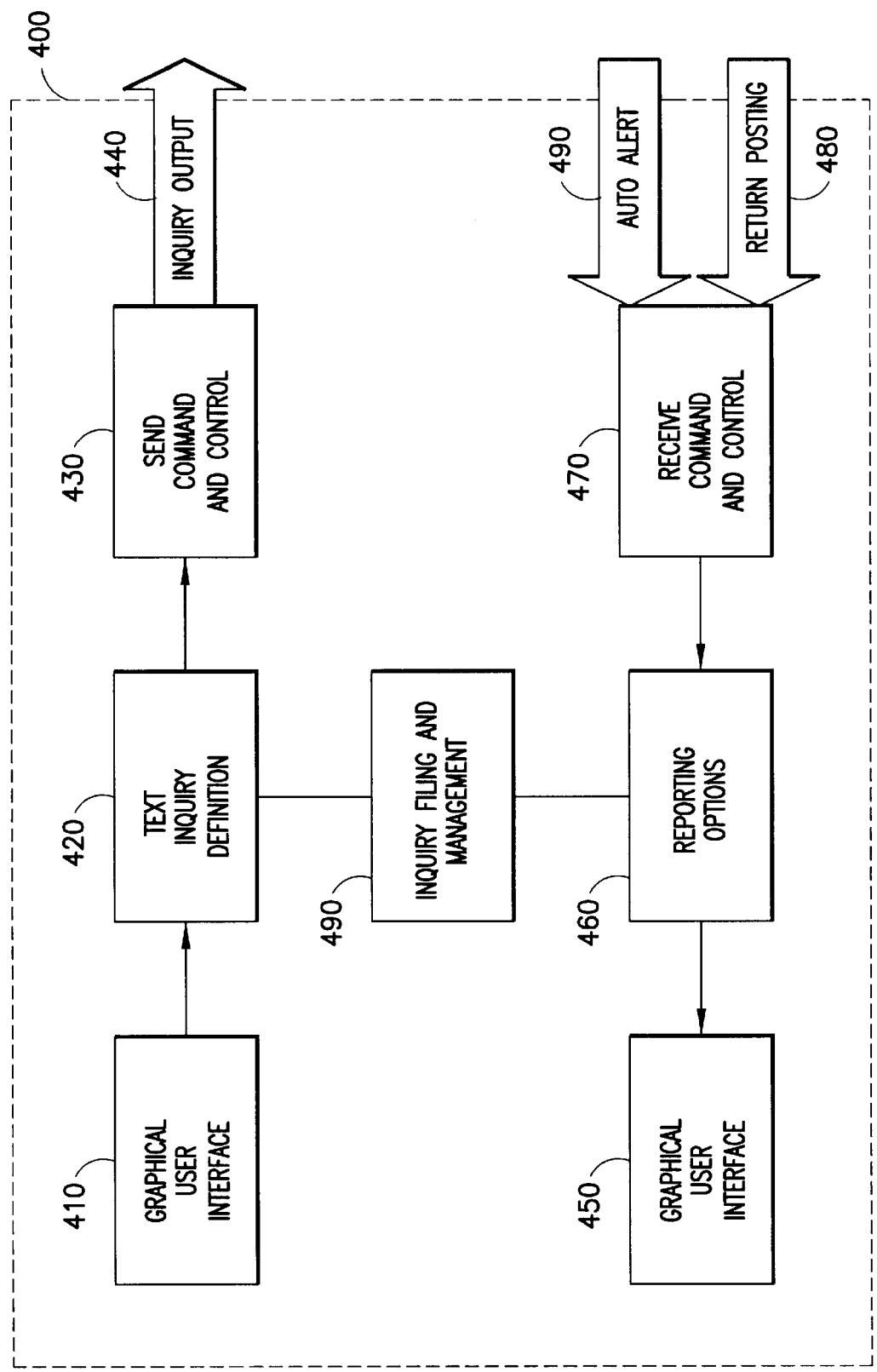
FIG. 4 shows the design of an inquiry client that requests particular closed caption text events or is the recipient of an automatically generated response from the remote central server based upon previously defined requirements.

Using FIG. 4 as a reference for the Inquiry Client processing, 400, a defined user specifies search requirements using a graphical user interface, 410, to define a text definition and query, 420. The definition is structured by the command and control program, 430, for submission to the remote central server via the inquiry output program, 440. As required, all inquiry postings and results can be maintained on the inquiry client, 400, by the program, 490. This allows the local user to review previous postings and to use the same inquiry or a modified inquiry in the next search interval.

Search results from the Internet-accessed or other communication tool returned by the remoter server, 500, are displayed as a list of program citations, with each citation having a sub-listing of key sentences. Citations are received by the Return Posting program, 480, and processed by the receive command and control task, 470, to manage any interface exchange or conversion option required by the application. The Graphical User Interface function, 450, can display web oriented pages and buttons. Buttons on the web site's results page allow users to expand key sentences into stories an&-stories into whole newscasts. Program citations identify specific news programs that include the words being searched for. For example, a program can be identified by the date it was broadcast, the city (or market) from which the broadcast originated, the call letters or name of the station or program source originating the broadcast, the name or title of the program, and the time of day the program was broadcast.

Under each program citation is a list of associated sentences that contain the searched-for terms. In other words, rather than returning the full text of entire stories that contain searched-for terms, the system first returns only key sentences. These sentences, because they contain the terms the user is looking for, provide an overview of the full story, allowing the user to quickly scan many stories without having to look at the fun text of each of those stories. The full text of any found story is available by clicking on an associated button. Likewise, the full text of the entire newscast in which the story appears can be viewed with the click of a button. The system allows users to first see their searched-for terms within the context of specific sentences and gives them the option of "zooming out" to see the sentences in the context of a story, and the story in the context of an entire broadcast. This hierarchy (citation>sentence>story>newscast) is the most efficient way of displaying the results of a search that may return hundreds of found stories.

Another system process provides for ongoing automatic searches of a user's predefined search parameters and the delivery of the results of such parameters to the user via electronic mail or other electronic messaging systems. The preferred embodiment of this automated search process is the process called AutoAlert™, contained within 490. A web page interface in the Inquiry Client, for example, allows the user to specify AutoAlert™ parameters through steps 410, 420, 430 and 440. The AutoAler™ database results are displayed via a web page in the same fashion as described above. The remote central server, 500, will automatically transmit results back to the inquiry client, 400, at any time when pre-specified search requests have been initialized and positive search results are available. In this situation, the inquiry client has previously defined a set of search conditions for closed captioned text and has stored that definition on the remote central server, 500, during a previous inquiry session. The Inquiry Client, 400, completes the communication task, 440, and returns to an inactive and offline mode essentially dropping all active communication through communication channel and methods. This search definition remains active within the remote central server, 500, as the server continuously tests all received closed captioned material from all clients, for the prescribed search material. If and when the material is located, the remote central server, 500, initiates an automatic communication request to the responsible Inquiry Client, 400, that posted the original request. At a user's discretion, results may also be delivered to the user via electronic mail or another electronic messaging system.

In the embodiments of the present invention described above, it will be recognized that individual elements and/or features thereof are not necessarily limited to a particular embodiment but, where applicable, are interchangeable and can be used in any selected embodiment even though such may not be specifically shown. It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense. It is also to be understood that the following claims are intended to cover all of the generic and specific features of the invention herein described and all statements of the scope of the invention which, as a matter of language, might be said to fall there between.

We claim:

1. In a system for the aggregation and selective retrieval of television word content from closed captioned text streams, a search results database maintained on an inquiry client, the database being returned to the inquiry client from a central server, the database comprising:

all closed captioning text derived from one or more television program segments captured from one or more geographically diverse television signals, said closed captioning text being decoded and parsed remotely from the inquiry client, and being conditioned remotely from the inquiry client to have consistent formatting regardless of their origin, whereby said decoded, parsed, conditioned, consistent formatted, closed captioning text is: (a) returned to the inquiry client by the central server as a result of a user inquiry submitted to the central server, (b) maintained by the inquiry client, and (c) readily user readable.

2. The database of claim 1, said text comprising a common unique news story part.

3. The database of claim 2, wherein said text is substantially free of parts unrelated to the said unique news story part.

4. The database of claim 3, said text comprising an index word.

5. The database of claim 1, said text having a common key word.

6. The database of claim 1, said text comprises a predetermined minimum number of letter characters and numerical characters.

7. The database of claim 1, said text comprises the National Captioning Institute (NCI) standard symbol.

8. The database of claim 1, said text comprises TV station, date and time indicia.

9. The database of claim 1, said text comprises a predetermined minimum number of letter characters and numerical characters; each text further comprises the National Captioning Institute (NCI) standard symbol; and each text further comprises TV station, date and time indicia.

10. The database of claim 1, said text comprising updated texts comprising the most current television station broadcast.

11. The database of claim 10, wherein the database is in user readable format.

12. In a system for the aggregation and selective retrieval of television word content from closed captioned text streams, a search results database maintained on an inquiry client, the database being returned to the inquiry client from a central server, the database comprising:

all closed captioning text derived from one or more television program segments captured from one or more geographically diverse television signals, said closed captioning text being decoded and parsed remotely from the inquiry client, and being conditioned remotely from the inquiry client to have consistent formatting regardless of their origin, whereby said decoded, parsed, conditioned, consistent formatted, closed captioning text is: (a) returned to the inquiry client by the central server as a result of a user inquiry submitted to the central server, (b) maintained by the inquiry client, and (c) readily user readable, said database produced by a method for the aggregation and selective retrieval of television word content from closed captioned texts comprising:
  (a) receiving a plurality of geographically diverse television signals;
  (b) decoding closed captioned text streams in said one or more television signals and writing said decoded closed captioned text streams to a file;
  (c) collecting and transmitting said decoded closed captioned text streams from one or more local clients and/or servers to one or more remote central servers;
  (d) conditioning the collected closed captioned text to improve format consistency across all text files regardless of origin;
  (e) managing closed captioned text streams with a graphical user interface; and
  (f) stating closed captioned text streams on a remote central server making said file available to a user of said system.

13. The database of claim 12, said text comprising a common unique news story part.

14. The database of claim 13, wherein said text is substantially free of parts unrelated to the said unique news story part.

15. The database of claim 14, said text comprising an index word.

16. The database of claim 12, said text having a common key word.

17. The database of claim 12, said text comprises a predetermined minimum number of teller characters and numerical characters.

18. The database of claim 12, said text comprises the National Captioning Institute (NCI) standard symbol.

19. The database of claim 13, said text comprises TV station, date and time indicia.

* * * * *